United States Patent
Roy et al.

(10) Patent No.: US 9,301,306 B2
(45) Date of Patent: Mar. 29, 2016

(54) SELF-ORGANIZING OFDMA SYSTEM FOR BROADBAND COMMUNICATION

(71) Applicant: Honeywell International Inc., Morristown, NJ (US)

(72) Inventors: Aloke Roy, Gaithersburg, MD (US); Thanga Anandappan, Bangalore (IN); Sharath Babu Malve, Karanataka (IN)

(73) Assignee: Honeywell International Inc., Morristown, NJ (US)

( * ) Notice: Subject to any disclaimer, the term of this patent is extended or adjusted under 35 U.S.C. 154(b) by 27 days.

(21) Appl. No.: 13/975,450

(22) Filed: Aug. 26, 2013

(65) Prior Publication Data
US 2014/0355528 A1    Dec. 4, 2014

Related U.S. Application Data

(60) Provisional application No. 61/827,844, filed on May 28, 2013.

(51) Int. Cl.
| | |
|---|---|
| *H04W 4/00* | (2009.01) |
| *H04W 72/04* | (2009.01) |
| *H04W 4/02* | (2009.01) |
| *H04B 7/185* | (2006.01) |
| *H04W 84/18* | (2009.01) |
| *H04W 74/04* | (2009.01) |

(52) U.S. Cl.
CPC ......... *H04W 72/048* (2013.01); *H04B 7/1856* (2013.01); *H04W 4/025* (2013.01); *H04W 74/04* (2013.01); *H04W 84/18* (2013.01)

(58) Field of Classification Search
None
See application file for complete search history.

(56) References Cited

U.S. PATENT DOCUMENTS

| | | | | |
|---|---|---|---|---|
| 4,839,658 | A * | 6/1989 | Kathol et al. | 342/455 |
| 5,848,359 | A | 12/1998 | Furtaw | |
| 6,735,630 | B1 * | 5/2004 | Gelvin et al. | 709/224 |
| 7,808,377 | B2 | 10/2010 | Shafaat et al. | |
| 8,121,593 | B2 | 2/2012 | Pandit et al. | |

(Continued)

FOREIGN PATENT DOCUMENTS

| | | |
|---|---|---|
| EP | 0837567 | 4/1998 |
| EP | 2590341 | 5/2013 |
| WO | 2010103217 | 9/2010 |

OTHER PUBLICATIONS

"Aeronautical Communications", Apr. 13, 2013, pp. 14, Publisher: DLR—Institute of Communications and Navigation.

(Continued)

*Primary Examiner* — Edan Orgad
*Assistant Examiner* — Rebecca Song
(74) *Attorney, Agent, or Firm* — Fogg & Powers LLC

(57) ABSTRACT

Systems and methods for a self-organizing OFDMA system for broadband communication are provided. In certain embodiments a communication node for a self organizing network comprises a communication interface configured to transmit data to and receive data from a plurality of nodes; and a processing unit configured to execute computer readable instructions. Further, computer readable instructions direct the processing unit to identify a sub-region within a cell, wherein the communication node is located in the sub-region; and transmit at least one data frame, wherein the data from the communication node is transmitted at a particular time and frequency as defined within the at least one data frame, where the time and frequency are associated with the sub-region.

20 Claims, 8 Drawing Sheets

(56) References Cited

U.S. PATENT DOCUMENTS

| | | | |
|---|---|---|---|
| 8,190,147 B2 | 5/2012 | Kauffman et al. | |
| 2005/0090201 A1* | 4/2005 | Lengies et al. | 455/41.2 |
| 2006/0212133 A1* | 9/2006 | Damnjanovic et al. | 700/1 |
| 2009/0005034 A1* | 1/2009 | de la Tousche et al. | 455/431 |
| 2009/0201846 A1* | 8/2009 | Horn et al. | 370/315 |
| 2009/0318137 A1* | 12/2009 | Kauffman et al. | 455/428 |
| 2010/0017506 A1* | 1/2010 | Fadell | 709/224 |
| 2012/0008571 A1* | 1/2012 | Li et al. | 370/329 |
| 2012/0176993 A1* | 7/2012 | Wang et al. | 370/329 |
| 2013/0006511 A1 | 1/2013 | Ramaiah et al. | |
| 2013/0089009 A1* | 4/2013 | Li et al. | 370/278 |
| 2014/0169327 A1* | 6/2014 | Chun et al. | 370/330 |

OTHER PUBLICATIONS

Yan et al., "Critical Transmission Range for Connectivity in Aeronautical Ad-hoc Networks", "Proceedings of the 10th World Congress on Intelligent Control and Automation", Jul. 6-8, 2012, pp. 4446-4451, Published in: CN.

European Patent Office, "European Search Report from Application Serial No. 14160759.8", "from Foreign Counterpart U.S. Appl. No. 13/975,450", Dec. 9, 2014, pp. 13, Published in: EP.

European Patent Office, "European Office Action for Serial No. 14160759.8", "from Foreign Counterpart U.S. Appl. No. 13/975,450", Jan. 8, 2015, pp. 1-5, Published in: EP.

* cited by examiner

SELF-ORGANIZING OFDMA SYSTEM FOR BROADBAND COMMUNICATION

CROSS-REFERENCE TO RELATED APPLICATIONS

This application claims the benefit of U.S. Provisional Application No. 61/827,844, filed on May 28, 2013, which is incorporated herein by reference in its entirety.

GOVERNMENT LICENSE RIGHTS

This invention was made with Government support under contract number NNA12AB80C awarded by NASA Ames Research Center. The Government has certain rights in the invention.

BACKGROUND

Current datalink technologies use centralized ground stations that coordinate and manage resources, frequencies, and bandwidth for end nodes within the ground station's range of control for data transmission and reception from the centralized ground stations. Yet, in oceanic regions, as it is difficult to install ground stations, satellite links are used for communicating with vehicles. However, satellite based service can be expensive and is also subject to disadvantages for air-to-air broadcast services as satellite networks do not support the direct end node to end node broadcasts that are used for airborne surveillance applications. Satellite broadcasts generally broadcast in a single direction, i.e. from end notes to satellites and then to other end nodes.

In typical satellite communications between an end node and a ground station, packets are sent to a ground station for processing and routing. When communicating through a satellite, an end node broadcasts a packet to the satellite and the satellite downlinks the packet to the ground station for processing. The ground station then sends an uplink message to the satellite for broadcasting over a region. Due to the relaying of messages through the satellite, there is a considerable amount of bandwidth loss and additional latency in communications due to the multiple transmissions of the same information across different network nodes.

SUMMARY

Systems and methods for a self-organizing OFDMA system for broadband communication are provided. In certain embodiments a communication node for a self organizing network comprises a communication interface configured to transmit data to and receive data from a plurality of nodes; and a processing unit configured to execute computer readable instructions. Further, computer readable instructions direct the processing unit to identify a sub-region within a cell, wherein the communication node is located in the sub-region; and transmit at least one data frame, wherein the data from the communication node is transmitted at a particular time and frequency as defined within the at least one data frame, where the time and frequency are associated with the sub-region.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
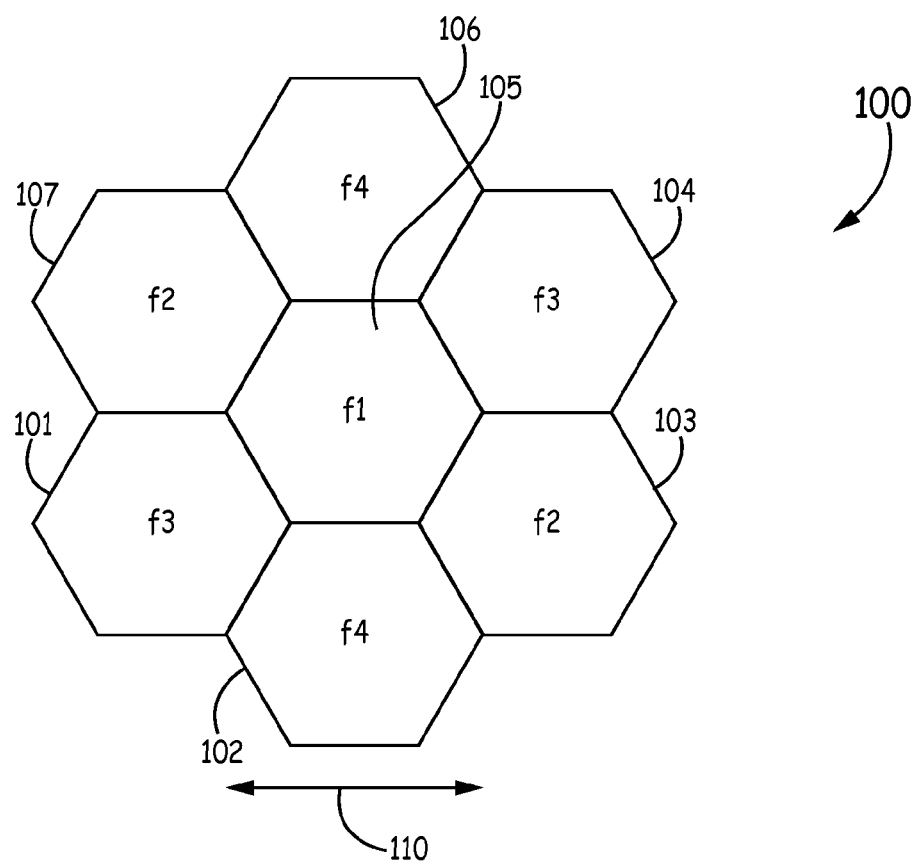
FIG. 1 is a diagram of a geographic region that is divided into different cells in one embodiment described in the present disclosure.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

Embodiments described herein provide for a self-organizing datalink that can be deployed between air systems without the support of a ground based communication infrastructure. Further, the self-organizing datalink technology can support both broadcast and point to point communication applications. In at least one implementation, the datalinks are self-organized by dividing a geographical region into cells and then dividing each cell into sub-regions based on an exclusive aircraft space, where the exclusive aircraft space may be the space that can be occupied by no more than one aircraft according to flight regulations. Aircraft within the cell then broadcast data at a particular time and frequency based on the sub-region currently occupied by the aircraft. In an alternative implementation, a ground communication node can communicate with the aircraft through the self-organizing datalinks.

FIG. 1 is a diagram of a geographic region 100 that is divided into different cells 101-107. In one implementation, the size of a cell is determined by the broadcast range 110 of aircraft that fly within the geographic region 100. For example, if an aircraft has a broadcast range of 50 nautical miles, the cells 101-107 will have a size of 50 nautical miles in diameter. Thus, an aircraft that is within the cell is able to communicate with the other aircraft within the cell. To further distinguish the cells 101-107 from one another, as illustrated each of the cells 101-107 in the geographic region 100 has an associated frequency channel. Also, in certain implementations, a channel may also include an associated set of sub-carriers. In an example of associating frequency channels with geographic regions, aircraft within cells 101 and 104 broadcast data at frequency channel f3, aircraft within cells 102 and 106 broadcast data at frequency channel f4, aircraft within cells 103 and 107 broadcast data at frequency channel f2, aircraft within cell 105 broadcast data at frequency channel f1. In one implementation, aircraft in adjacent cells broadcast data on different frequency channels. Because adjacent cells are associated with different frequency channels, at least four frequency channels are used throughout the geographic region 100. However, more frequency channels may be used throughout the geographic region 100. In an example, an orthogonal frequency-division multiple access (OFDMA) communication scheme is used by the aircraft in the geographic region 100. In such an example, a frequency channel (f1, f2, etc.) for a cell refers to a given frequency bandwidth including a plurality of orthogonal sub-carriers.

Figure 2:
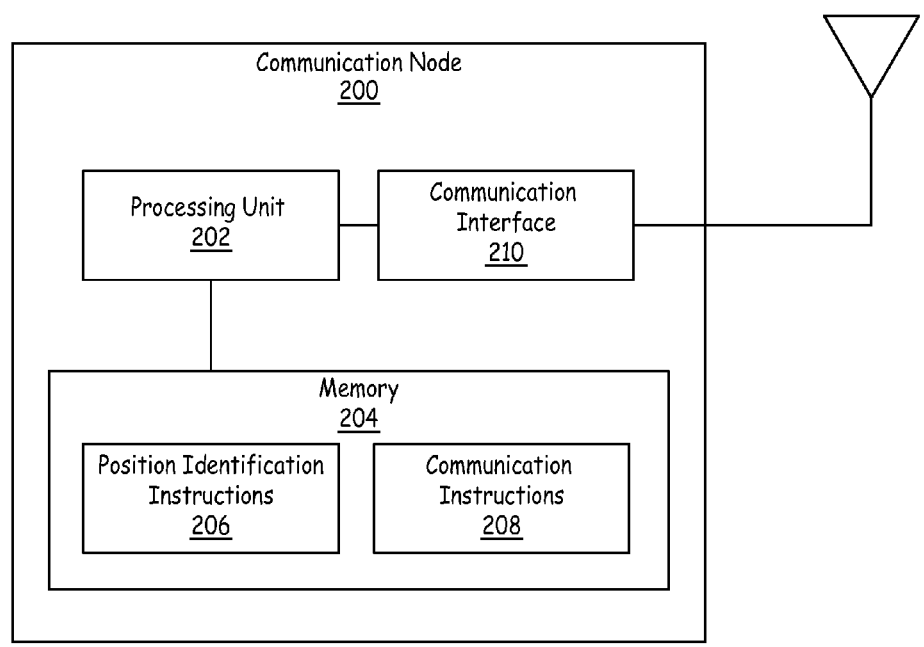
FIG. 2 is a diagram illustrating a communication node in a self-organizing network in one embodiment described in the present disclosure.

FIG. 2 illustrates a block diagram of a communication node 200 for communicating in a self-organizing network according to the above description. As illustrated, the communication node 200 includes a processing unit 202 and a memory unit 204. The memory unit 204 contains executable machine code that is used for communicating with other communication nodes in a self-organizing network. For example, the memory unit 204 includes position identification instructions 206 and communication instructions 208. The position identification instructions 206 are configured to cause the processing unit 202 to determine a location of the communication node 200, when the position identification instructions 206 are executed by the processing unit 202. The communication instructions 208 are configured to cause the processing unit 202 to transmit and receive communications within the geographic region 100, when executed by the processing unit 202. More detail regarding position identification instructions 206 and communication instructions 208 is provided below.

Figure 3:
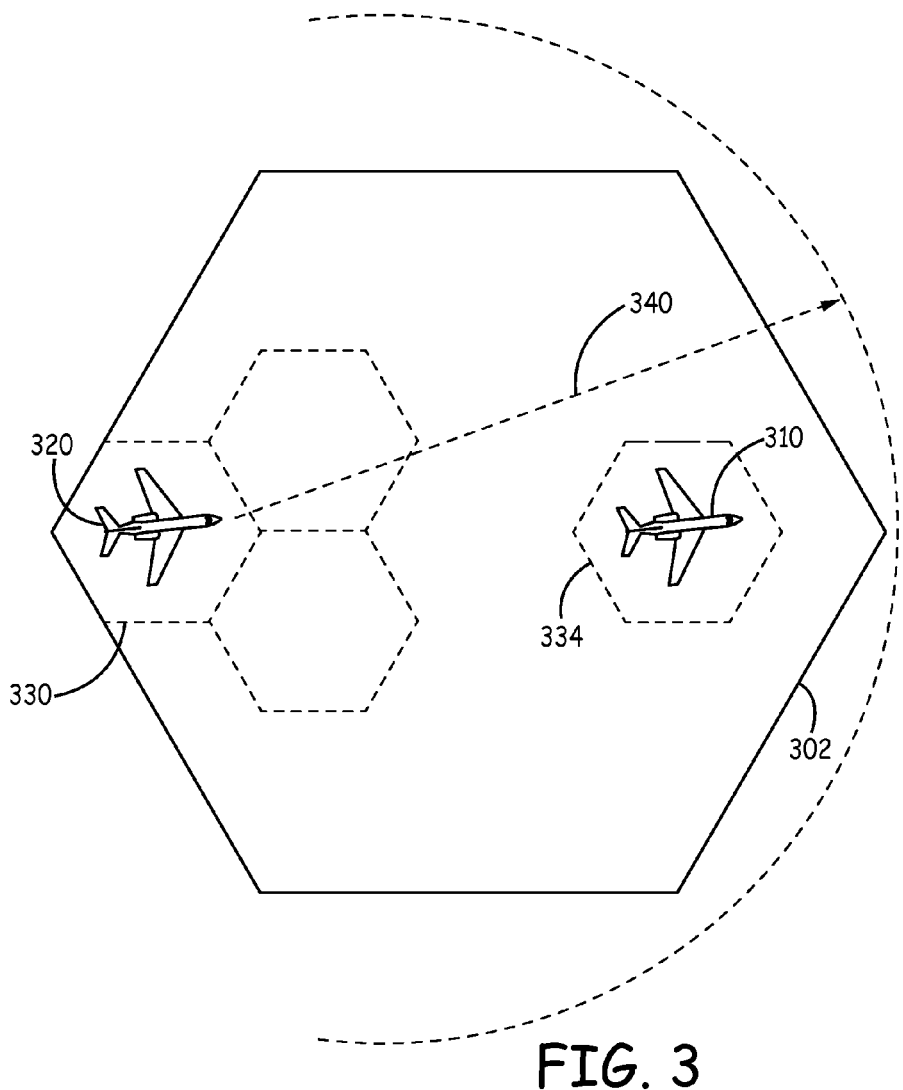
FIG. 3 is a diagram illustrating multiple aircraft located at different sub-regions within a cell in one embodiment described in the present disclosure.

FIG. 3 illustrates multiple aircraft 310 and 320 within a cell 302. In this example, the range 340 of the radio on an aircraft (as shown for aircraft 320) is determined based on the size of the cell 302. The aircraft 310 and 320 are located at different locations within the cell 302.

Each cell is divided into a plurality of three-dimensional spaces, referred to herein as sub-regions. In certain embodiments, the size of each sub-region (and therefore the number of sub-regions within a cell) is determined by the smallest uniquely identifiable area within a cell that is exclusive to a single aircraft. Using sub-region size that corresponds to the area that is exclusive to a single aircraft ensures that only a single aircraft will be present within any given sub-region at a given time. In one implementation, the smallest uniquely identifiable area is determined based on safety regulations that control how close aircraft can fly to one another both horizontally and vertically. For example, if a cell is 150 nautical miles in diameter and regulations dictate that aircraft should keep a lateral distance of 10 nautical miles from one another and 80 nm between the leading and trailing aircraft in an air route, there will be 30 different sub-regions within a horizontal level in that particular cell. In the vertical direction, cells may be divided into different levels. For example, the cell having 30 different sub-regions within a horizontal level may also have five different vertical levels. Thus, the cell may have 150 different sub-regions within the particular cell. In at least one implementation, the cells 101-107 and sub-regions are statically defined throughout the geographic region 100. Alternatively, the cells 101-107 and sub-regions may be dynamically defined based on the aircraft within the geographic region 100.

A common communication scheme is used across the geographic region 100, such that communications to and from aircraft within the geographic region 100 are coordinated with one another. In an example, the communication scheme assigns a respective frequency and time slot to each sub-region within each cell of the geographic region. In examples where the communication scheme is OFDMA, each the frequency and time slot assigned to each sub-region comprises one or more data resource units within a given OFDMA frequency channel. As such, each sub-region is assigned one or more sub-carriers in one or more time slots within the OFDMA frequency channel. In particular, the one or more data resource units assigned to a given sub-region are resource unit(s) from the OFDMA frequency channel assigned to the cell in which the sub-region is present.

At a given time, the position of each aircraft 310 and 320 within the geographic region 100 is located within a particular sub-region within a particular cell 302. In the example shown in FIG. 3, the aircraft 320 is within sub-region 330 and the aircraft 310 is within sub-region 334. In at least one implementation, when implementing self-organizing communications between the aircraft 310 and 320, each aircraft broadcasts data at the time slot and frequency (e.g., the one or more data resource units) associated with the sub-region containing the aircraft.

In certain embodiments, when the communication node 200 communicates with other communication nodes, the processing unit 202 executes the position identification instructions 206 to determine the location of the communication node 200 within a cell. In at least one implementation, to determine the location of the communication node 200 within a cell, the communication node 200 includes an inertial navigation system. Alternatively, the communication node 200 includes a global navigation satellite system receiver, a flight management system, or other system that is capable of reliably determining position in three dimensional space. When the position identification instructions are executed by the processing unit 202, the processing unit 202 uses any signals provided by a navigation system to determine the location of the communication node 200 within a cell.

When the position within the cell is identified, the processing unit 202 proceeds to execute the communication instructions 208. When executing the communication instructions 208, the processing unit 202 uses the identified position to determine the cell through which the aircraft is travelling and the processing unit 202 also identifies the sub-region within the cell through which the aircraft is travelling. When the sub-region and the cell are identified, the communication instructions 208 can determine the time slot and frequency for communications that is assigned to that sub-region. The communication instructions 208 can then direct the processing unit 202 to transmit messages within the time slot and at the frequency through a communication interface 210, where the time slot and the frequency are associated with the sub-region in which the aircraft is located within the cell. When scheduling the transmission of messages, the time slots and frequencies may be statically associated with the different sub-regions or the time slots and frequencies may be dynamically allocated to aircraft within different sub-regions. The scheduling of the message transmissions is described in greater detail below. In a further implementation, the communication node 208 receives communications from other aircraft within the cell. Based on the frequency and the time at which the data is received, the processing unit 202 may be able to determine the sub-regions in the cell that are currently occupied by other aircraft.

Figure 4:
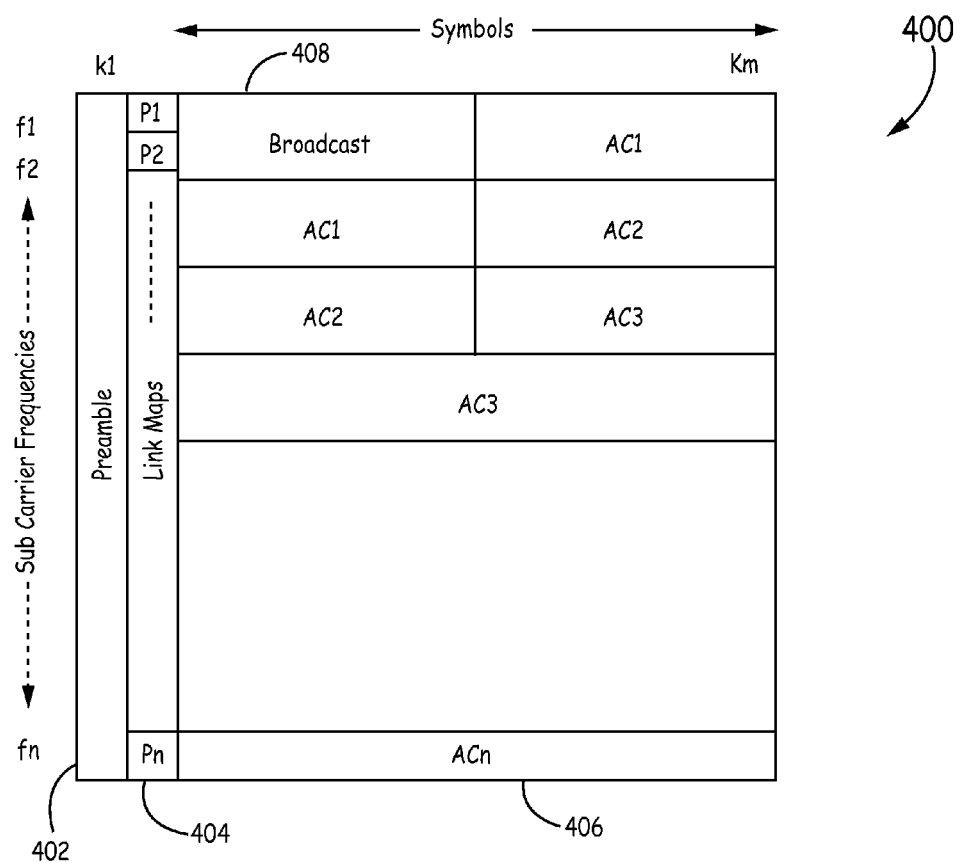
FIG. 4 is a diagram of a frame map in one embodiment described in the present disclosure.

FIG. 4 illustrates a frame map 400 that maps data resource units 406 to particular sub-regions within a cell, where a resource unit 406 is a scheduled period of time where a communication node at a particular position can broadcast on a particular frequency within the channel. In certain implementations, the position of the communication node is associated with a position unit that represents a sub-region in a cell. In at least one implementation, the resource units are allocated based on orthogonal frequency-division multiple access technology (OFDMA) as represented by the frame map 400. For example, the frame map 400 defines a preamble 402, link maps 404, and data resource units 406 that are reserved for aircrafts or other nodes in a self-organizing network.

In at least one implementation, the data resource units 406 are statically scheduled according to a sub-region within a cell. For example, each sub-region within a cell is associated with a statically predefined frequency. If an aircraft desires to transmit data within the geographic region 100, the aircraft identifies the position of the aircraft and the sub-region associated with the position of the aircraft. As each sub-region has a statically predefined frequency, the aircraft broadcasts information at specific data resource units 406 associated with the sub-region.

Figure 5:
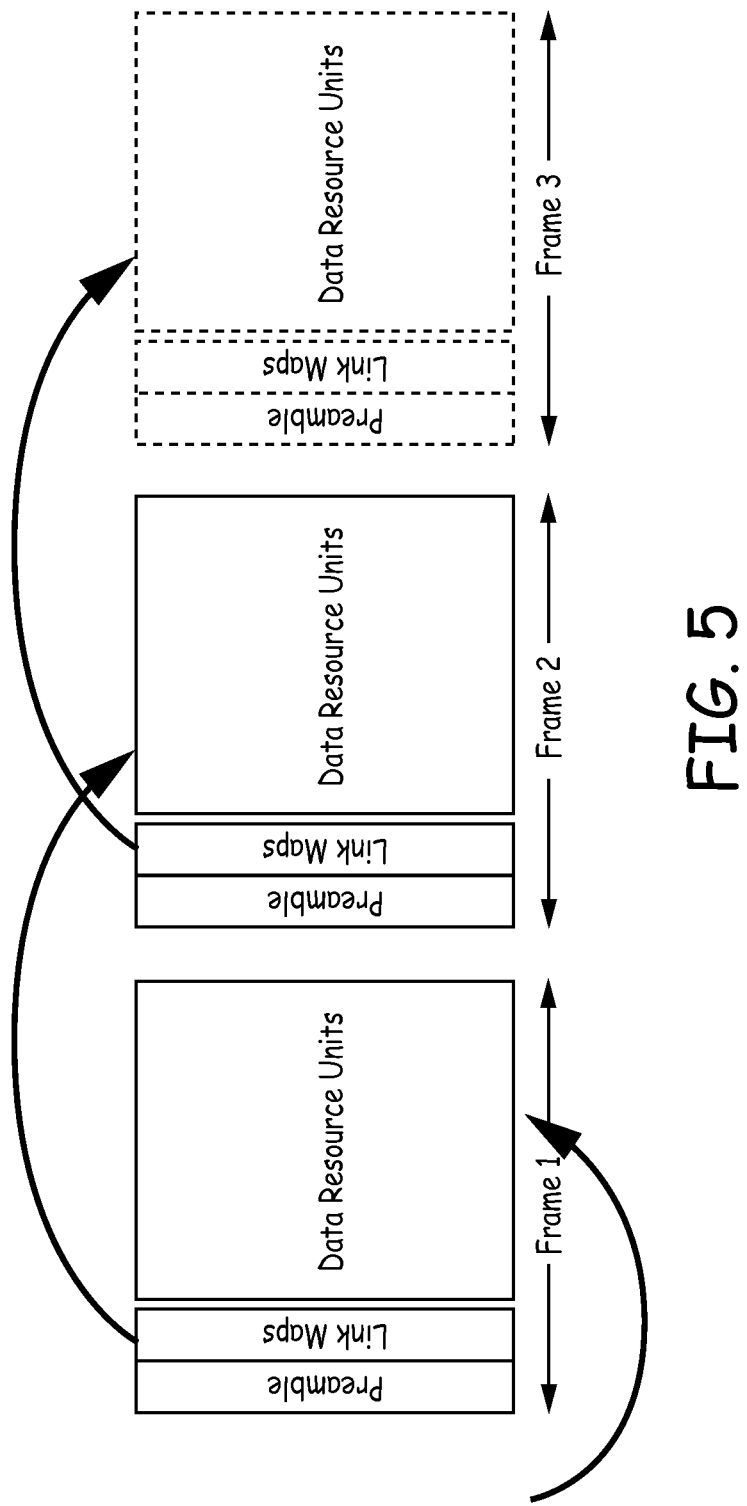
FIG. 5 illustrates the allocations of resource units based on reservations made in a link map of a frame in one embodiment described in the present disclosure.

In an alternative implementation, the data resource units 406 are dynamically allocated, wherein the data resource units 406 are dynamically allocated to different sub-regions according to scheduling algorithms stored on each aircraft. In one exemplary implementation, aircraft within the cell communicate resource requirements to each other in the link map 404, where the link map 404 defines the allocation of data resource units 406 per sub-region within a cell. In at least one exemplary implementation, when an aircraft transmits the resource requirements in the link map 404, the aircraft calculates the resource requirement based on an aircraft traffic forecast for aircraft in the cell. Thus, the link map 404, at a particular time, includes the resource requirements from all the broadcasting aircraft within the cell. Upon the reception of the link map 404 in a frame unit, a scheduler algorithm on each aircraft allocates the data resource units 406 to the aircraft according to the resource requirements in the link map 404. For instance, the scheduler algorithm may allocate the data resource units 406 according to an ordering of the sub-regions within the cell. Further, the scheduler algorithm may be standardized across the aircraft so that the allocation of data resource units 406 is the same for the various aircraft in the network. The scheduler is standardized to avoid the collision of scheduled resource units. In certain situations, the resource requirements requested by the aircraft within the cell exceed the number of available resource units. When the number of resource requirements exceeds the available resource units, a fair scheduling algorithm may be used that adjusts the requested resource requirements such that the communications may fit within the available data resource units 406. FIG. 5 illustrates the allocation of resource units based on reservations made in the link maps of the frame. For example, in a first frame, a scheduler reserves resource units for communication by a first aircraft. In the subsequent frame the first aircraft will broadcast data at the reserved resource unit.

Figure 6:
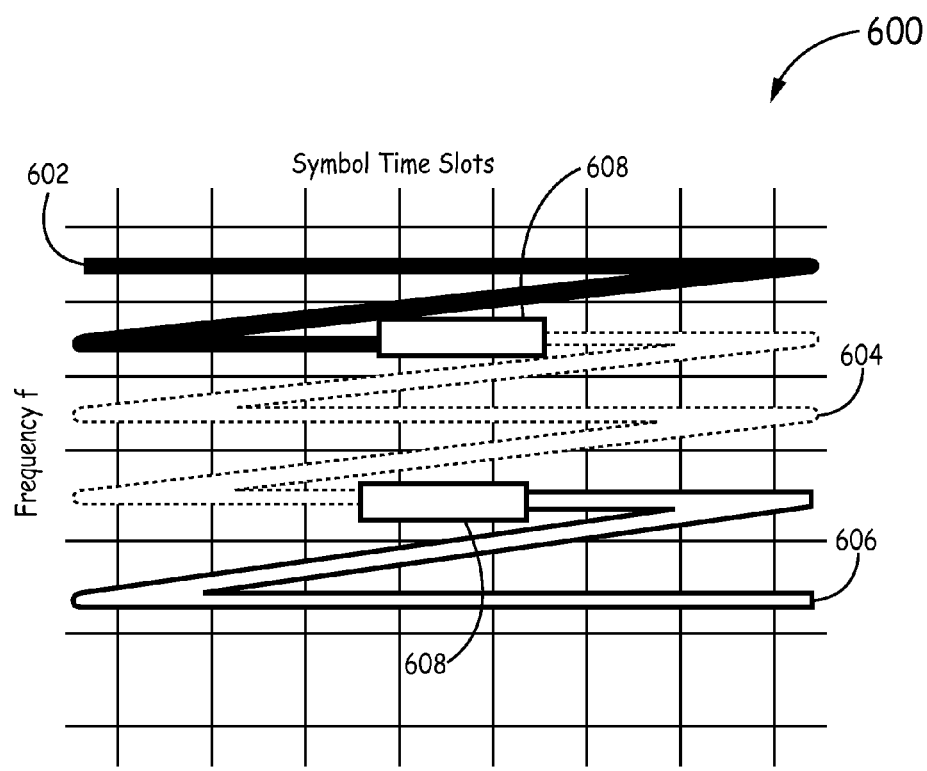
FIG. 6 is a graph that illustrates the scheduling of resource units to sub-regions within a cell in one embodiment described in the present disclosure.

FIG. 6 is a graph 600 that illustrates the scheduling of data resource units 406 to sub-regions within a cell. When allocating the communications, the scheduler allocates communications first according to symbol time slots for a given frequency and then according to frequency. As shown in graph 600 the scheduler begins by scheduling a first allocation 602 of data resource units for communications by a first aircraft in a particular sub-region. In certain implementations, the scheduler first assigns the symbol time slots in a particular sub-carrier frequency. When the first allocation 602 uses all the symbol time slots of the particular sub-carrier frequency, the scheduler begins allocating resource units to the first allocation 602 at another sub-carrier frequency. When the scheduler finishes the scheduling of resource units to the first allocation 602 and there are still symbol time slots to schedule on the same sub-carrier frequency, the scheduler allocates a gap 608 before scheduling resource units to a second allocation 604 of resource units for communication by a second aircraft in a second sub-region. In certain implementations, the size of the gap depends upon the time synchronization tolerance needed in the network between different aircraft. For example, the aircraft may synchronize to UTC for time synchronization. In at least one implementation, the allocations by the scheduler are contiguous with regards to one another. For example, if a particular sub-region is not occupied by an aircraft, the resource units associated with the particular sub-region will be allocated to another aircraft in a different sub-region so that the different allocations become contiguous with the next available aircraft. For example, the resource units in the third allocation 606 may be normally associated with a different sub-region, but as the different sub-region does not have a communicating aircraft, the scheduler schedules the third allocation 606 to a sub-region that possesses a communicating aircraft. Further, if the total number of requested resource units exceeds the overall number of resource units available per frame, the requests are scaled down to increase the number of possible different resource unit allocations. In certain implementations, the size of the resource unit allocated to an aircraft may be capped. Further, due to the gap that is placed between resource units when a resource unit does not use all the symbols for a particular sub-carrier frequency, the scheduler is able to allocate the highest percentage of frames to communications by aircraft when each sub-carrier frequency is allocated to communication by a single aircraft.

Figure 7:
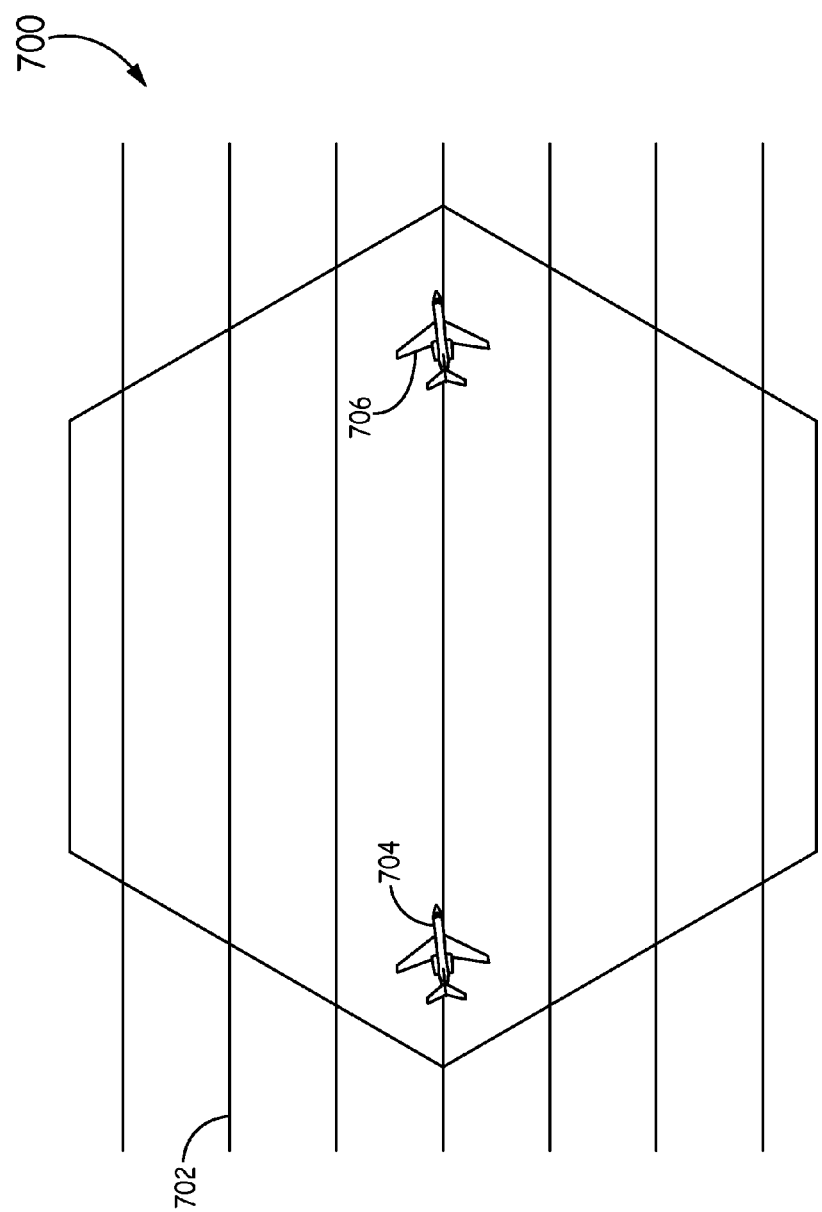
FIG. 7 illustrates the separating of a cell into different sub-regions in one embodiment described in the present disclosure.

FIG. 7 shows another implementation for separating a cell 700 into different sub-regions. To divide the cell into sub-regions, a number of fixed lateral paths 702 through the cell are calculated. The different fixed paths 702 are equally spaced apart from one another based on a fixed lateral offset that is equal to the mandated distance that is kept between aircraft. Further each fixed lateral path can have a number of different aircraft at any given moment. For example each lateral path may have 2 aircraft 704 and 706 at any given moment. Thus, the number of possible aircraft in a region is equal to the number of fixed lateral paths 702 through a cell multiplied by the number of possible aircraft on a particular fixed lateral path. For example, cell 700 has seven fixed lateral paths 702, when the number of possible aircraft on a path is 2, there will be 14 possible aircraft on a particular vertical level. If there are five vertical levels, then the scheduler will allocate resource units to 70 possible sub-regions or position units. Further, at times the paths of aircraft may cross and their horizontal position may be approximately at the same horizontal location, however, when aircraft cross they will cross at different vertical levels within a sub-region. Further, as an aircraft travels through a sub-region, the aircraft uses trajectory information and knowledge of its position to determine which sub-region presently contains the aircraft. The scheduler on the aircraft uses the knowledge of its sub-region to determine which resource unit to allocate for communications from the aircraft.

Figure 8:
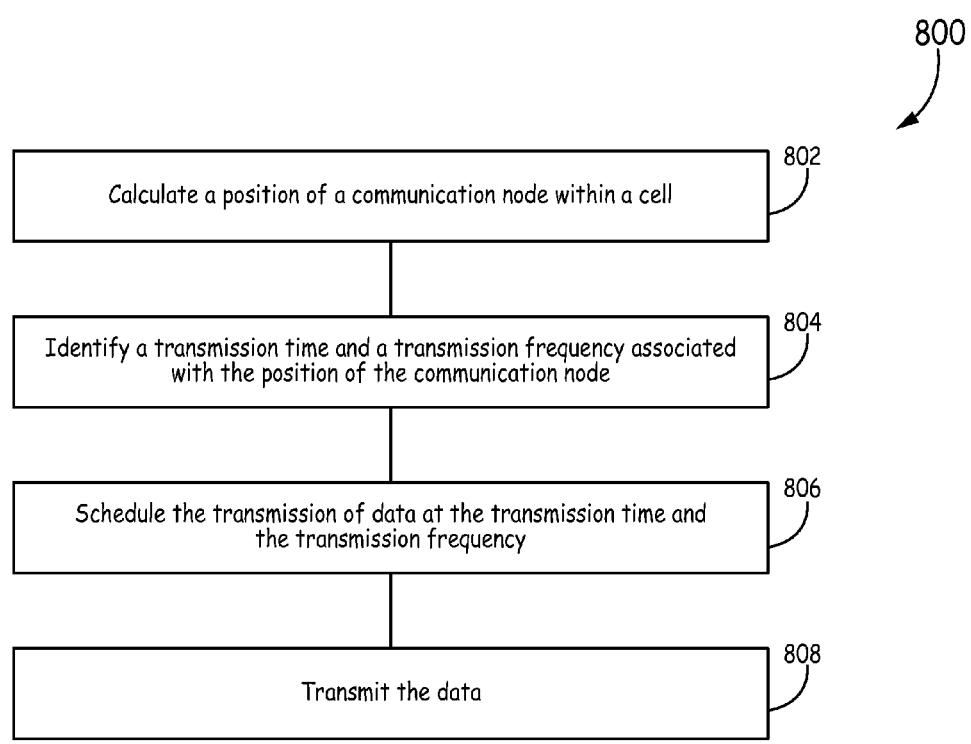
FIG. 8 is a flow diagram of a method for establishing communications by an aircraft when entering a cell in one embodiment described in the present disclosure.

FIG. 8 is a flow diagram illustrating a method 800 for establishing communications in a self-organizing network.

Method 800 proceeds at 802, where the position within a cell of a communication node is calculated. For example, an aircraft determines in which sub-region within the cell the aircraft is presently flying. Method 800 then proceeds at 804, where a transmission time and a transmission frequency associated with the position of the communication node is identified. For example, in one implementation, each sub-region within the cell has a statically defined transmission time and transmission frequency. Alternatively, the transmission time and the transmission frequency are dynamically associated with the sub-region.

In certain implementations, method 800 proceeds at 806, where the transmission of data at the transmission time and the transmission frequency is scheduled. For example, when the scheduling is dynamically performed, a scheduler transmits a data resource unit request in a link map in a first frame to reserve data resource units in a subsequent frame. As multiple communication nodes can transmit the data resource unit requests in the first frame, the different schedulers on the different communication nodes employ a standardized algorithm to sequentially allocate the data resource units based on the data resource unit requests. Method 800 proceeds at 808, where the data is transmitted. For example, the data is transmitted in the allocated data resource unit.

Example Embodiments

Example 1 includes a communication node for a self organizing network, the communication node comprising: a communication interface configured to transmit data to and receive data from a plurality of nodes; a processing unit configured to execute computer readable instructions, wherein the computer readable instructions direct the processing unit to: identify a sub-region within a cell, wherein the communication node is located in the sub-region; transmit at least one data frame, wherein the data from the communication node is transmitted at a particular time and frequency as defined within the at least one data frame, where the time and frequency are associated with the sub-region.

Example 2 includes the communication node of Example 1, wherein the communication node is at least one of: a ground based communication node; and an aircraft.

Example 3 includes the communication node of any of Examples 1-2, wherein the transmission of the at least one data frame comprises: transmitting a data resource unit request in a link map of a first frame in the at least one data frame, wherein the data resource unit request identifies the particular time and frequency at which the data is transmitted; and transmitting the data in a data resource unit in a second frame, wherein the data resource unit is transmitted at the particular time and frequency.

Example 4 includes the communication node of Example 3, wherein the computer readable instructions further direct the processing unit to: receive at least one data resource unit request in the link map of the first frame from at least one other communication node within the cell; and schedule the transmission of data based on the at least one data resource unit request and the data resource unit request.

Example 5 includes the communication node of any of Examples 1-4, wherein the particular time and frequency are statically associated with the sub-region.

Example 6 includes the communication node of any of Examples 1-5, wherein the communication node is an aircraft, the cell is divided into sub-regions based on the number of aircraft that can exist safely in the cell at the same time;

Example 7 includes the communication node of any of Examples 1-6, wherein the cell is divided into sub-regions based on the number of lateral paths through the cell, the number of vertical levels, and the number of communication nodes that can exist on a lateral path at the same time.

Example 8 includes the communication node of any of Examples 1-7, wherein the frequency is a sub-carrier frequency of an orthogonal frequency-division multiplexing channel.

Example 9 includes a self organizing network, the network comprising: a plurality of communication nodes, wherein an individual communication node in the plurality of communication nodes comprises a processing unit that is configured to: determine a position of the individual communication node; transmit a data resource unit requests; receive other data resource unit requests from other communication nodes in the plurality of communication nodes; and schedule a transmission of node data based on the data resource unit request and the other data resource unit requests.

Example 10 includes the network of Example 9, wherein the individual communication node is at least one of: a ground based communication node; and an aircraft.

Example 11 includes the network of any of Examples 9-10, wherein the transmission of the node data comprise transmitting the data resource unit request in a link map of a frame, wherein the data resource unit request identifies requirements of data resource units to be used for the transmission of the node data in a subsequent frame;

Example 12 includes the network of Example 11, wherein the processing unit schedules the transmission of the node data according to a common scheduling algorithm that is used to schedule transmissions of other node data from the other communication nodes.

Example 13 includes the network of any of Examples 9-12, wherein a frame contains a plurality of data resource units at a plurality of frequencies, wherein each frequency in the plurality of frequencies comprises a plurality of symbols.

Example 14 includes the network of Example 13, wherein the first processing unit and the second processing unit allocate data resource units to the transmission of the first node data at a first set of frequencies in the plurality of frequencies and to the transmission of the second node data at a second set of frequencies in the plurality of frequencies.

Example 15 includes the network of Example 14, wherein when the first set of symbol time slots and the second set of symbol time slots overlap at a single frequency, the first processing unit and the second processing unit designate a set of data resource units associated with the single frequency as a gap between data resource units allocated to the transmission of the first node data at the single frequency and data resource units allocated to the transmission of the second node data at the single frequency.

Example 16 includes the network of any of Examples 13-15, wherein when the number of requested data resource units in the combined first data resource unit request and the second data resource unit request exceeds the number of data resource units in the plurality of data resource units, the first processing unit and the second processing unit decrease the number of allocated data resource units for the first node data and the second node data.

Example 17 includes a method for a self-organized network, the method comprising: calculating a position of a communication node within a cell; identifying a transmission time and a transmission frequency associated with the position of the communication node; scheduling the transmission of data at the transmission time and the transmission frequency; and transmitting the data.

Example 18 includes the method of Example 17, wherein scheduling the transmission of data comprises: transmitting a data resource unit request in a link map of a first frame, wherein the data resource unit request is associated with the transmission time and the transmission frequency; receiving at least one other data resource unit request in the link map of the first frame from at least one other communication node within the cell; and allocating data resource units in a second frame for transmission of the data.

Example 19 includes the method of Example 18, wherein the communication node and the at least one other communication node sequentially allocate data resource units according to the position of the communication node and the at least one other communication node within the cell; and wherein the communication node and the at least one other communication node use a standardized scheduling algorithm to schedule data transmissions.

Example 20 includes the method of any of Examples 17-19, wherein identifying the transmission time and the transmission frequency associated with the position of the communication node comprises identifying data resource units statically associated with the position of the communication node within the cell.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

The invention claimed is:

1. A communication node for a self organizing network, the communication node comprising:
   a communication interface configured to transmit data to and receive data from a plurality of nodes;
   a processing unit configured to execute computer readable instructions, wherein the computer readable instructions direct the processing unit to:
   identify a sub-region within a cell, wherein the cell is divided into sub-regions based on an area that is exclusive to a single communication node, wherein the communication node is a vehicle, wherein the communication node is located in the sub-region;
   transmit at least one data frame, wherein the data from the communication node is transmitted at a particular time and frequency as defined within the at least one data frame, where the time and frequency are associated with the sub-region.

2. The communication node of claim 1, wherein the vehicle is at least one of:
   a ground based communication node; and
   an aircraft.

3. The communication node of claim 1, wherein transmit at least one data frame comprises:
   transmitting a data resource unit request in a link map of a first frame in the at least one data frame, wherein the data resource unit request identifies the particular time and frequency at which the data is transmitted; and
   transmitting the data in a data resource unit in a second frame, wherein the data resource unit is transmitted at the particular time and frequency.

4. The communication node of claim 3, wherein the computer readable instructions further direct the processing unit to:
   receive at least one data resource unit request in the link map of the first frame from at least one other communication node within the cell; and
   schedule the transmission of data based on the at least one data resource unit request.

5. The communication node of claim 1, wherein the particular time and frequency are statically associated with the sub-region.

6. The communication node of claim 1, wherein the vehicle is an aircraft, wherein the area that is exclusive to a single communication node is defined based on the number of aircraft that can exist in the cell at the same time according to safety regulations.

7. The communication node of claim 1, wherein the cell is divided into sub-regions based on the number of lateral paths through the cell, the number of vertical levels, and the number of communication nodes that can exist on a lateral path at the same time.

8. The communication node of claim 1, wherein the frequency is a sub-carrier frequency of an orthogonal frequency-division multiplexing channel.

9. A self organizing network, the network comprising:
   a plurality of communication nodes, wherein each individual communication node in the plurality of communication nodes comprises a processing unit that is configured to:
   determine a position of the individual communication node, wherein the position is within a sub-region of a cell, wherein the cell is divided into sub-regions based on an area exclusive to an individual communication node, wherein the individual communication node is a vehicle;
   transmit a data resource unit request;
   receive other data resource unit requests from other communication nodes in the plurality of communication nodes; and
   schedule a transmission of node data based on the data resource unit request and the other data resource unit requests, wherein the schedule is based on a position of the plurality of communication nodes.

10. The network of claim 9, wherein the vehicle is at least one of:
    a ground based communication node; and
    an aircraft.

11. The network of claim 9, wherein the transmission of the node data comprises transmitting the data resource unit request in a link map of a frame, wherein the data resource unit request identifies requirements of data resource units to be used for the transmission of the node data in a subsequent frame.

12. The network of claim 11, wherein the processing unit schedules the transmission of the node data according to a common scheduling algorithm that is used to schedule transmissions of other node data from the other communication nodes.

13. The network of claim 11, wherein a frame contains a plurality of data resource units at a plurality of frequencies, wherein each frequency in the plurality of frequencies comprises a plurality of symbol time slots.

14. The network of claim 13, wherein a first processing unit of a first individual communication node and a second processing unit of a second individual communication node allocate data resource units to the transmission of first node data at a first set of frequencies in the plurality of frequencies and to the transmission of second node data at a second set of frequencies in the plurality of frequencies.

15. The network of claim 14, wherein when a first set of symbol time slots designated for the first individual communication node and a second set of symbol time slots designated for the second individual communication node overlap at a single frequency, the first processing unit and the second processing unit designate a set of data resource units associated with the single frequency as a gap between data resource units allocated to the transmission of the first node data at the single frequency and data resource units allocated to the transmission of the second node data at the single frequency.

16. The network of claim 14, wherein when a total number of requested data resource units in a first data resource unit request and a second data resource unit request exceeds the number of data resource units in the plurality of data resource units in the frame, the first processing unit and the second processing unit decrease the number of allocated data resource units for the first node data and the second node data.

17. A method for a self-organized network, the method comprising:
    calculating a position of a communication node within a cell, wherein the position is within a sub-region of the cell, wherein the cell is divided into sub-regions based on an area exclusive to an individual communication node, wherein the communication node is a vehicle;
    identifying a transmission time and a transmission frequency associated with the position of the communication node;
    scheduling a transmission of data at the transmission time and the transmission frequency; and
    transmitting the data.

18. The method of claim 17, wherein scheduling the transmission of data comprises:
    transmitting a data resource unit request in a link map of a first frame, wherein the data resource unit request is associated with the transmission time and the transmission frequency;
    receiving at least one other data resource unit request in the link map of the first frame from at least one other communication node within the cell; and
    allocating data resource units in a second frame for transmission of the data.

19. The method of claim 18, wherein the communication node and the at least one other communication node sequentially allocate data resource units according to the position of the communication node and the at least one other communication node within the cell; and
    wherein the communication node and the at least one other communication node use a standardized scheduling algorithm to schedule data transmissions.

20. The method of claim 17, wherein identifying the transmission time and the transmission frequency associated with the position of the communication node comprises identifying data resource units statically associated with the position of the communication node within the cell.

* * * * *